(12) United States Patent
Rajagopalan et al.

(10) Patent No.: US 9,018,294 B2
(45) Date of Patent: Apr. 28, 2015

(54) CATIONIC POLYUREA COVER COMPOSITIONS FOR A MULTI-LAYER GOLF BALL

(75) Inventors: Murali Rajagopalan, Fairhaven, MA (US); Shawn Ricci, Fairhaven, MA (US); Michael J. Sullivan, Fairhaven, MA (US); Kevin M. Harris, Fairhaven, MA (US); Pamela V. Arnold, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 746 days.

(21) Appl. No.: 12/333,803

(22) Filed: Dec. 12, 2008

(65) Prior Publication Data
US 2010/0151970 A1    Jun. 17, 2010

(51) Int. Cl.
| | | |
|---|---|---|
| A63B 37/00 | (2006.01) | |
| A63B 37/12 | (2006.01) | |
| C08G 18/10 | (2006.01) | |
| C08K 5/098 | (2006.01) | |
| C08G 18/08 | (2006.01) | |

(52) U.S. Cl.
CPC .............. *C08G 18/10* (2013.01); *C08K 5/098* (2013.01); *C08G 18/0809* (2013.01); *C08G 18/0814* (2013.01); *A63B 37/0027* (2013.01); *A63B 37/0023* (2013.01); *A63B 37/0038* (2013.01)

(58) Field of Classification Search
None
See application file for complete search history.

(56) References Cited

U.S. PATENT DOCUMENTS

| | | | |
|---|---|---|---|
| 4,560,168 A | 12/1985 | Aoyama | 273/232 |
| 4,617,341 A * | 10/1986 | Laine et al. | 524/591 |
| 4,960,281 A | 10/1990 | Aoyama | 273/232 |
| 5,334,673 A | 8/1994 | Wu | 273/235 R |
| 5,484,870 A | 1/1996 | Wu | 528/28 |
| 5,688,191 A | 11/1997 | Cavallaro et al. | 473/373 |
| 5,692,974 A | 12/1997 | Wu et al. | 473/377 |
| 5,713,801 A | 2/1998 | Aoyama | 473/54 |
| 5,803,831 A | 9/1998 | Sullivan et al. | 473/374 |
| 5,849,168 A | 12/1998 | Lutz | 264/755 |
| 5,885,172 A | 3/1999 | Hebert et al. | 473/354 |
| 5,908,358 A | 6/1999 | Wu | 473/378 |
| 5,919,100 A | 7/1999 | Boehm et al. | 473/354 |
| 5,965,669 A | 10/1999 | Cavallaro et al. | 525/221 |
| 5,981,654 A | 11/1999 | Rajagopalan | 525/66 |
| 5,981,658 A | 11/1999 | Rajagopalan et al. | 525/72 |
| 6,056,842 A | 5/2000 | Dalton et al. | 156/243 |
| 6,149,535 A | 11/2000 | Bissonnette et al. | 473/354 |
| 6,180,040 B1 | 1/2001 | Ladd et al. | 264/248 |
| 6,180,722 B1 | 1/2001 | Dalton et al. | 525/193 |
| 6,193,619 B1 | 2/2001 | Wu et al. | 473/374 |
| 6,207,784 B1 | 3/2001 | Rajagopalan | 528/71 |
| 6,386,992 B1 | 5/2002 | Harris et al. | 473/371 |
| 6,503,156 B1 | 1/2003 | Sullivan | 473/374 |
| 6,506,130 B2 | 1/2003 | Sullivan | 473/374 |
| 6,835,794 B2 | 12/2004 | Wu | 528/64 |
| 6,958,379 B2 | 10/2005 | Wu et al. | 528/64 |
| 7,098,274 B2 | 8/2006 | Wu et al. | 525/467 |
| 2001/0009310 A1 | 7/2001 | Herbert | |
| 2001/0018375 A1 | 8/2001 | Hayashi | |
| 2001/0019971 A1 | 9/2001 | Hayashi | |
| 2002/0025862 A1 | 2/2002 | Sullivan | |
| 2002/0028885 A1 | 3/2002 | Sullivan | |
| 2003/0045378 A1 | 3/2003 | Bissonnette | |
| 2003/0096936 A1 | 5/2003 | Wu | |
| 2003/0114624 A1 | 6/2003 | Harris | |
| 2003/0176988 A1 | 9/2003 | Boehm | |
| 2003/0199337 A1 | 10/2003 | Herbert | |
| 2003/0212240 A1 | 11/2003 | Wu | |
| 2003/0220464 A1 | 11/2003 | Wu | |
| 2004/0077434 A1 | 4/2004 | Matroni | |
| 2004/0077435 A1 | 4/2004 | Matroni | |
| 2004/0092335 A1 | 5/2004 | Boehm | |
| 2004/0132549 A1 | 7/2004 | Aoyama | |
| 2004/0132550 A1 | 7/2004 | Aoyama | |
| 2004/0132551 A1 | 7/2004 | Aoyama | |
| 2004/0166963 A1 | 8/2004 | Bissonnette | |
| 2004/0209708 A1 | 10/2004 | Bulpett | |
| 2004/0229995 A1 | 11/2004 | Wu | |
| 2004/0262808 A1 | 12/2004 | Wu | |
| 2004/0266971 A1 | 12/2004 | Wu | |
| 2005/0009637 A1 | 1/2005 | Wu | |
| 2005/0009638 A1 | 1/2005 | Wu | |
| 2005/0009642 A1 | 1/2005 | Wu | |
| 2005/0079929 A1 | 4/2005 | Tzivanis | |
| 2005/0272900 A1* | 12/2005 | Kuntimaddi et al. | 528/44 |
| 2006/0036056 A1 | 2/2006 | Wu | |
| 2006/0094542 A1 | 5/2006 | Aoyama | |
| 2006/0142096 A1 | 6/2006 | Sullivan | |
| 2006/0173139 A1 | 8/2006 | Ricci | |
| 2006/0178233 A1 | 8/2006 | Ricci | |
| 2006/0205913 A1 | 9/2006 | Wu et al. | |
| 2006/0264269 A1 | 11/2006 | Rajagopalan et al. | |
| 2006/0267244 A1 | 11/2006 | Rajagopalan et al. | |
| 2006/0270491 A1 | 11/2006 | Jordan | |
| 2007/0001348 A1 | 1/2007 | Melanson | |
| 2007/0026969 A1 | 2/2007 | Melanson | |
| 2007/0040297 A1 | 2/2007 | Melanson | |
| 2007/0087863 A1 | 4/2007 | Matroni | |
| 2007/0093320 A1 | 4/2007 | Bissonnette | |
| 2007/0117656 A1 | 5/2007 | Rajagopalan | |
| 2007/0117923 A1 | 5/2007 | Wu | |
| 2007/0129510 A1 | 6/2007 | Kuntimaddi | |
| 2007/0149322 A1 | 6/2007 | Aoyama | |

(Continued)

OTHER PUBLICATIONS

Final Office Action dated Mar. 20, 2012 of corresponding U.S. Appl. No. 12/333,936.

(Continued)

*Primary Examiner* — David Buttner
(74) *Attorney, Agent, or Firm* — Smith, Gambrell & Russell, LLP (57) ABSTRACT

Golf balls that have at least one layer formed from a cationic polyurea material. In particular, the compositions of the invention, which include a polymer backbone including urea linkages with cationic groups, may be formed from an isocyanate-containing component and an isocyanate-reactive component, at least one of which includes precursor cationic groups, in the presence of an alkylating, quaternizing, or ternarizing agent.

19 Claims, 2 Drawing Sheets

(56) References Cited

U.S. PATENT DOCUMENTS

| | | |
|---|---|---|
| 2007/0197724 A1 | 8/2007 | Wu |
| 2007/0219019 A1 | 9/2007 | Matthews |
| 2007/0219021 A1 | 9/2007 | Matroni |
| 2007/0222120 A1 | 9/2007 | Melanson |
| 2007/0238849 A1 | 10/2007 | Wu |
| 2008/0035168 A1 | 2/2008 | Waterman |
| 2008/0051222 A1 | 2/2008 | Matroni |
| 2010/0151967 A1 | 6/2010 | Rajagopalan |

OTHER PUBLICATIONS

Final Office Action dated Mar. 20, 2012 of corresponding U.S. Appl. No. 12/333,964.

Chinese Office Action dated May 30, 2013 of corresponding Chinese Patent Application No. 200910258382.7.

GuideChem product sheet for Ethacure 300; no date.

Non-Final Office Action dated Jan. 15, 2014 of corresponding U.S. Appl. No. 12/333,964.

Jeff Dalton, Compression by Any Other Name, Science and Golf IV, Proceedings of the World Scientific Congress of Golf (Eric Thain ed., Routledge, 2002).

Non-Final Office Action dated Jul. 29, 2011 of corresponding U.S. Appl. No. 12/333,936.

Non-Final Office Action dated Jul. 29, 2011 of corresponding U.S. Appl. No. 12/333,964.

Era Technical Data for Ethacure300; p. 1-2; May 2005.

* cited by examiner

CATIONIC POLYUREA COVER COMPOSITIONS FOR A MULTI-LAYER GOLF BALL

FIELD OF THE INVENTION

The present invention relates to golf balls that have at least one layer formed from a cationic polyurea material. In particular, the compositions of the invention, which include a polymer backbone including urea linkages with cationic groups, may be formed from an isocyanate-containing component and an isocyanate-reactive component in the presence of an alkylating, quaternizing, or ternarizing agent. In another embodiment, the compositions of the invention are formed by reactive extrusion of an isocyanate prepolymer or monomer in the presence of an amine moiety with a post-polymerization reaction by alkylating, quaternizing, or ternarizing agents. The compositions of the invention may be used in any outer layer of a golf ball, e.g., an outer cover layer or inner cover layer, or may be used as a coating to be disposed over a structural outer layer of a golf ball.

BACKGROUND OF THE INVENTION

Golf ball manufacturers have been experimenting with various materials and manufacturing methods for golf balls over the years in an attempt to improve overall performance and durability and to further refine the manufacturing process.

For example, over the past years, golf ball manufacturers have been using ionomer resins for golf ball cover materials because of the durability, rebound, and scuff resistance characteristics of the materials. However, while ionomer resins are more durable than other types of golf ball layer materials, the same properties that result in durability also provide a hard "feel" and generally result in a lower spin rate and, thus, lower control, due to the hardness of the material.

Alternatively, polyurethane compositions produce "soft" covers and typically allow for greater control because of the increased spin. Because conventional polyurethane cover materials are typically formed of aromatic components, the ultraviolet degradation of the material, which leads to yellowing, led to the recent trend toward light stable cover materials, such as aliphatic polyurethane and polyurea materials. Whether aromatic or aliphatic in nature, however, the relative softness of the polyurethane and polyurea materials introduces durability issues.

Further attempts to compensate for the "hard" feel of ionomer-covered golf balls and durability and adhesion issues with polyurethane-covered and polyurea-covered golf balls have resulted in blends of hard ionomer resins, i.e., resins with hardness values of about 60 Shore D and above, with relatively softer polymeric materials. For example, blends of hard ionomers with polyurethanes have been used to form intermediate layers and cover layers of golf balls. However, such blends generally have processing difficulties associated with their use in the production of golf balls due to the incompatibility of the components. In addition, golf balls produced from these incompatible mixtures will have inferior golf ball properties such as poor durability, cut resistance, and the like.

As such, a need exists in the golf ball art for materials that have the performance benefits of polyurethane and/or polyurea, but also have desirable resiliency and compatibility to decorative layers such as paints and inks. In addition, golf balls having layers formed, at least in part, from such compositions would be advantageous. The present invention addresses such materials, methods of forming the materials, and portions of golf balls formed from these materials.

SUMMARY OF THE INVENTION

The present invention is directed to a golf ball including a core and a cover, wherein the cover includes a polymer including: a polyurea prepolymer including an isocyanate-containing component and an isocyanate-reactive component, wherein the polyurea prepolymer includes between about 1 and about 50 percent cationic groups by weight of the polyurea prepolymer; and a curative including: an amine-terminated curing agent; and a neutralizing agent having the general formula QX where Q includes hydrogen, an alkyl group, a benzyl groups, or a combination thereof and X includes a monovalent anion.

In this aspect of the invention, the cover may include an inner cover and an outer cover and either or both of the cover layers may be formed from the polymer. In one embodiment, the outer cover includes the polymer. In another embodiment, the inner cover includes the polymer.

In one embodiment, the isocyanate-reactive component includes a primary diamine, a secondary diamine, a primary triamine, a secondary triamine, or a mixture thereof. In another embodiment, the isocyanate-reactive component includes a primary triamine or a secondary triamine.

The present invention also relates to a golf ball including a core and a cover, wherein the cover includes a polymer including: a polyurea prepolymer including the reaction product of an isocyanate-containing component and an isocyanate-reactive component, wherein the isocyanate-reactive component has one of the following general structures:

where $R_1$ includes unsubstituted or substituted straight chain or branched aliphatic groups, unsubstituted or substituted aromatic groups, or mixtures thereof, wherein $R_2$ and $R_3$ independently include an alkyl group, an aryl group, or an aralkyl group, and wherein the polyurea prepolymer includes between about 5 percent and about 25 percent cationic groups by weight of the prepolymer; and a curative including an amine-terminated compound.

In this aspect of the invention, the curative may further include a neutralizing agent having the general formula QX, wherein Q includes hydrogen, an alkyl group, a benzyl groups, or a combination thereof and X includes a monovalent anion. In addition, the cationic groups may be selected from the group consisting of $\equiv N^{\oplus}-$, $\equiv P^{\oplus}-$, $\equiv S^{\oplus}-$, and mixtures thereof.

The cover may include an inner cover layer and an outer cover layer. In one embodiment, the inner cover layer includes the polymer. In an alternate embodiment, the outer cover layer includes the polymer.

The present invention is also directed to a golf ball including at least one layer including a polymer including a polyurea prepolymer formed from the reaction product of a diisocyanate and an amine-terminated component, wherein the polyurea prepolymer includes between about 1 percent and about 50 percent cationic groups selected from the group consisting of $\equiv N^{\oplus}-$, $\equiv P^{\oplus}-$, $\equiv S^{\oplus}-$, and mixtures thereof; and a curative including: an amine-terminated curing agent and a neutralizing agent, where the amine-terminated curing agent may have at least one of the following general formulas:

where $R_1$ includes unsubstituted or substituted straight chain or branched aliphatic groups, unsubstituted or substituted aromatic groups, or mixtures thereof, wherein $R_2$ and $R_3$ independently include an alkyl group, an aryl group, or an aralkyl group. The polymer may be thermoplastic or thermoset.

In this aspect of the invention, the neutralizing agent may have the general structure QX, wherein Q includes hydrogen, an alkyl group, a benzyl group, or a combination thereof and X includes a monovalent anion. In one embodiment, the monovalent anion includes fluoride, chloride, bromide, iodide, hydroxide, carbonate, and mixtures thereof. Furthermore, the golf ball may include a core, an intermediate layer disposed about the core to form an inner ball, and a cover disposed about the inner ball, and wherein the cover is formed from the polymer. In such a construction, the intermediate layer may be formed from a thermoplastic material. Alternatively, the intermediate layer may be formed from the polymer.

The present invention is also directed to a golf ball including at least one layer including a composition including: a polyurea prepolymer formed from the reaction product of a diisocyanate and an amine-terminated component; a curative including: an amine-terminated curing agent having at least one of the following general formulas:

where $R_1$ includes unsubstituted or substituted straight chain or branched aliphatic groups, unsubstituted or substituted aromatic groups, or mixtures thereof, wherein $R_2$ and $R_3$ independently include an alkyl group, an aryl group, or an aralkyl group, and wherein the amine-terminated curing agent further includes about 5 percent to about 25 percent precursor cationic groups by weight of the amine-terminated curing agent; and a neutralizing agent, wherein between about 20 percent and 70 percent of the precursor cationic groups are neutralized.

In this aspect of the invention, the curative may further include a flow modifier. In addition, the precursor cationic groups may include at least one of a tertiary amine, a phosphine, and a sulfide. Furthermore, the neutralizing agent may have the general structure QX, wherein Q includes hydrogen, an alkyl group, a benzyl groups, or a combination thereof and X includes a monovalent anion, where the monovalent anion may include fluoride, chloride, bromide, iodide, hydroxide, carbonate, and mixtures thereof.

Moreover, the golf ball in this aspect of the invention may include a core, an intermediate layer disposed about the core to form an inner ball, and a cover disposed about the inner ball, and wherein the cover is formed from the composition and the intermediate layer may be formed from any suitable intermediate layer. For example, in one embodiment, the intermediate layer is formed from a thermoplastic material. Alternatively, the intermediate layer may be formed from the composition and the cover may be formed from any suitable cover material.

The present invention also relates to a golf ball including a core and a cover, wherein the cover includes a composition including: a polyurea prepolymer formed from the reaction product of a diisocyanate and an amine-terminated component; a curative including: an amine-terminated curing agent including between about 1 percent to about 50 percent precursor cationic groups by weight of the amine-terminated curing agent; and a neutralizing agent having the general structure QX, wherein Q includes hydrogen, an alkyl group, a benzyl groups, or a combination thereof and X includes a monovalent anion. The composition may be thermoplastic or thermoset.

In this aspect of the invention, the cover may include an inner cover layer and an outer cover layer. In one embodiment, the inner cover layer includes the composition. In another embodiment, the outer cover layer includes the composition. In addition, between about 20 percent and 70 percent of the precursor cationic groups may be neutralized. Moreover, the composition may further include a flow modifier and allow greater than about 70 percent of the precursor cationic groups are neutralized.

In one embodiment, the precursor cationic groups include $\equiv N$, $\equiv P$, $\equiv S'$ or a combination thereof. In another embodiment, the amine-terminated curing agent includes between about 5 percent to about 25 percent precursor cationic groups by weight of the amine-terminated curing agent.

The present invention is also directed to a golf ball including a core and a cover, wherein the cover includes a castable reactive liquid material including: a polyurea prepolymer formed from the reaction product of a diisocyanate and an amine-terminated component; and a curative including an amine-terminated curing agent including between about 1 percent to about 50 percent cationic groups by weight of the amine-terminated curing agent, wherein the cationic groups are selected from the group consisting of $\equiv N^{\oplus}-$, $\equiv P^{\oplus}-$, $\equiv S^{\oplus}-$, and mixtures thereof.

In one embodiment, the cover includes an inner cover layer and an outer cover layer. In this aspect of the invention, the inner cover layer may include the polymer. Alternatively, the outer cover layer may include the polymer.

The amine-terminated curing agent may include between about 5 percent to about 25 percent precursor cationic groups by weight of the amine-terminated curing agent.

A golf ball including at least one layer including a composition including: a polyurea prepolymer formed from the reaction product of a diisocyanate and an amine-terminated component; a curative including an amine-terminated curing agent having at least one of the following general formulas:

where $R_1$ includes unsubstituted or substituted straight chain or branched aliphatic groups, unsubstituted or substituted aromatic groups, or mixtures thereof, wherein $R_2$ and $R_3$ independently include an alkyl group, an aryl group, or an aralkyl group, and wherein the amine-terminated curing agent further includes about 1 percent to about 50 percent cationic groups by weight of the amine-terminated curing agent. The composition may be thermoplastic or thermoset.

In one embodiment, the golf ball includes a core, an intermediate layer disposed about the core to form an inner ball, and a cover disposed about the inner ball, and wherein the cover is formed from the composition. In this aspect of the invention, the intermediate layer may be formed from a thermoplastic or thermoset material.

In another embodiment, the golf ball includes a core, an intermediate layer disposed about the core to form an inner ball, and a cover disposed about the inner ball, and wherein the intermediate layer is formed from the composition.

The amine-terminated curing agent may include between about 5 percent and 25 percent cationic groups by weight of the amine-terminated curing agent.

The present invention is also directed to a golf ball including a core, an intermediate layer disposed about the core, and a cover disposed about the intermediate layer, wherein at least one of the intermediate layer and cover is formed of a composition including: a polyurea prepolymer formed from the reaction product of a diisocyanate and an amine-terminated component; and an amine-terminated curing agent including between about 5 percent to about 25 percent cationic groups by weight of the amine-terminated curing agent, wherein the cationic groups are selected from the group consisting of $\equiv N^{\oplus}$—, $\equiv P^{\oplus}$—, $\equiv S^{\oplus}$—, and mixtures thereof.

In this aspect of the invention, the intermediate layer may include a thermoplastic material. In addition, the composition used to form the cover may be thermoset or thermoplastic.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

The present invention is directed to golf balls including at least one layer formed from a cationic polyurea composition. In particular, the compositions of the invention include a polyurea reaction product that contains cationic groups in the backbone of the polymer.

The compositions of the invention provide an alternative for a golf ball manufacturer to use on a traditional ionomer-covered ball or urethane-covered ball. In fact, without being bound to any particular theory, golf balls that include the compositions of the invention as cover layers have improved resilience, abrasion and impact resistance, and compatibility with paints and inks. As such, golf balls of the present invention, e.g., golf balls including cover layers formed from the compositions of the invention, may replace conventional golf balls including a dual cover system with a hard inner cover layer and a soft outer cover layer at least because the improved properties of the compositions will provide the benefits previously achieved with the dual cover system. In addition, the compositions of the invention may be used in an inner cover layer to achieve a superior ball as compared to a ball formed using conventional ionomers to form the inner cover.

The present invention also explores the methods of making such compositions and other golf ball constructions that incorporate the compositions of the invention in at least a portion thereof. In fact, the compositions of the invention can be used with a variety of golf ball constructions. For example, the compositions of the invention may be used as a cover layer in a two-piece ball with a large core, an outer cover layer in a three-piece ball with a relatively thin inner cover layer, an intermediate layer in a three-piece ball, or an inner cover layer in a golf ball having dual cover layers. The composition components, golf ball constructions, and layer and ball properties are discussed in greater detail below.

The Compositions of the Invention

The compositions of the invention may be formed in several ways, however, the resultant product is covalently incorporated or functionalized with cationic groups, which can impart desirable properties to the resulting polymer materials. In one embodiment, the composition is formed by first reacting an isocyanate-containing component with an isocyanate-reactive amine-terminated component to form a prepolymer containing urea linkages and then chain extending the prepolymer with an amine-terminated curative blend. Any or all of the isocyanate-containing components, isocyanate-reactive amine-terminated components, or curative may include at least one precursor group of a cationic group before, during, or after the prepolymer formation or the curing reaction. As such, the precursor groups of cationic groups can be neutralized to corresponding cationic groups before, during, or after the prepolymer formation or the curing reaction. The resulting composition will include a polymer backbone that includes cationic groups.

For example, in one embodiment, the composition is formed by reacting an isocyanate-containing component with at least one amine-terminated component to form a polyurea. The isocyanate-containing component may be a monomer, e.g., a diisocyanate, or a prepolymer, e.g., the reaction product of an isocyanate-containing component and an amine-terminated component. The polyurea is then subjected to a post-polymerization reaction with a neutralizing agent in which at least a portion of the amine groups in the backbone are alkylated, quaternized, or ternarized.

In another embodiment, a prepolymer formed from an isocyanate-containing component and an amine-terminated component, at least one of which includes at least one precursor group of a cationic group or a cationic group, is chain extended with an amine-based curative. The amine-based curative may include a neutralizing agent.

Other variations of the invention include the use of curatives that have already been neutralized, i.e., the curative includes cationic groups.

As used herein, the term "cationic group or precursor group thereof" means a group either already in cationic form or, by neutralization with a reagent, readily converted to the cationic form. Suitable precursor cationic groups (and neutralized cationic group form) are $\equiv N$ ($\equiv N^{\oplus}$—), $\equiv P$ ($\equiv P^{\oplus}$—), and $\equiv S$ ($\equiv S^{\oplus}$).

The term "neutralize" as used herein for converting precursor groups to ionic groups refers to alkylation, quaternarization, and ternarization. For example, the precursor cationic group may be quaternized or ternarized as the case may be by neutralization or quaternarization of the tertiary amine, or reacting the phosphine or sulfide with compounds capable of alkylating the phosphine or sulfide groups. As such, the term "neutralizing agent" as used herein refers to alkylating agents, quaternizing agents, ternarizing agents, or mixtures thereof. Suitable neutralizing agents include, but are not limited to, quaternizing agents having the formula QX, where Q may be hydrogen, benzyl, methyl, ethyl, and mixtures thereof and X may be a monovalent anion such as a halide (e.g., chloride, bromide, iodide, methyl sulfate, ethyl sulfate, $H_2PO_4^-$ and acetate). For example, quaternizing agents suitable for use with the present invention include, but are not limited to, dialkyl sulfates such as dimethyl sulfate, diethyl sulfate, and the like, alkyl halides such as methyl chloride, methyl bromide, and the like, benzyl halides such as benzyl chloride, N-(3-chloro-2-hydroxypropyl)-N,N,N-trimethylammonium chloride, glacial acetic acid, phosphoric acid, sodium chloroacetate, alkali metal salts of chlorocarboxylic or bromocarboxylic acids, hydrocarbyl substituted carbonates, and mixtures thereof. A sulfide-acid mixture may be used as a ternarizing agent according to the invention.

The subscript letters such as n, x, and y as used herein within the generic structures are understood by one of ordinary skill in the art as the degree of polymerization (i.e., the number of consecutively repeating units). In the case of molecularly uniformed products, these numbers are commonly integers, if not zero. In the case of molecularly non-uniformed products, these numbers are averaged numbers not limited to integers, if not zero, and are understood to be the average degree of polymerization.

The various components of the composition are discussed below.

Isocyanate-Containing Component

The isocyanate-containing component may be in the form of a monomer or prepolymer. For example, as used herein, the term "isocyanate-containing component" may be understood to encompass a monomer containing at least one terminal isocyanate (NCO) group, as well as a prepolymer containing at least one terminal isocyanate group. In one embodiment, the isocyanate-containing component includes at least two isocyanate groups.

The isocyanate-containing component may be aromatic, aromatic-aliphatic, or aliphatic, which provide varying degrees of light stability. As used herein, aromatic aliphatic compounds should be understood as those containing an aromatic ring, wherein the isocyanate group is not directly bonded to the ring. Along a continuum, an aromatic composition is less light stable than an aromatic-aliphatic composition, which is less light stable than an aliphatic composition. For example, an aliphatic composition made according to the invention includes only saturated components, i.e., components substantially free of unsaturated carbon-carbon bonds or aromatic groups, the use of which prevents yellowing over time. The term "saturated," as used herein, refers to compositions having saturated aliphatic and alicyclic polymer backbones, i.e., with no carbon-carbon double bonds. It is important to note, however, that aromatic compositions made according to the invention may include light stabilizers to improve light stability. Thus, light stability may be accomplished in a variety of ways for the purposes of this application.

Suitable isocyanate-containing components include diisocyanates having the generic structure: O=C=N—R—N=C=O, where R is preferably a straight chain or branched aliphatic group, a substituted straight chain or branched aliphatic group, an aromatic group, a substituted aromatic group, or mixtures thereof. In one embodiment, R is a hydrocarbon moiety containing from about 1 to 20 carbon atoms. The diisocyanate may also contain one or more cyclic groups. When multiple cyclic groups are present, linear and/or branched hydrocarbons containing from about 1 to 10 carbon atoms can be present as spacers between the cyclic groups. In some cases, the cyclic group(s) may be substituted at the 2-, 3-, and/or 4-positions, respectively. Substituted groups may include, but are not limited to, halogens, primary, secondary, or tertiary hydrocarbon groups, or a mixture thereof.

Examples of saturated (aliphatic) diisocyanates include, but are not limited to, ethylene diisocyanate; propylene-1,2-diisocyanate; tetramethylene diisocyanate; tetramethylene-1, 4-diisocyanate; 1,6-hexamethylene diisocyanate (HDI); HDI biuret prepared from HDI; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis (isocyanatomethyl)-cyclohexane diisocyanate; 4,4'-bis (isocyanatomethyl) dicyclohexane; 2,4'-bis (isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate $(H)_2MDI$); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In one embodiment, the saturated diisocyanates include isophorone-diisocyanate (IPDI), 4,4'-dicyclohexylmethane diisocyanate ($H_{12}$MDI), 1,6-hexamethylene diisocyanate (HDI), or a combination thereof.

As briefly discussed, aromatic aliphatic isocyanates may also be used as the isocyanate-containing component. While use of aromatic aliphatic materials does not confer the same amount of light stability to the resultant product compared to those including purely aliphatic materials, it does provide a greater degree of light stability to the resultant product compared to those formed with purely aromatic materials. Examples of aromatic aliphatic isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof, a modified polyisocyanate derived from the above isocyanates and polyisocyanates; and mixtures thereof. In addition, the aromatic aliphatic isocyanates may be mixed with any of the saturated isocyanates listed above for the purposes of this invention.

Unsaturated diisocyanates, i.e., aromatic compounds, may also be used as the isocyanate-containing component, although the use of unsaturated compounds in the precursor is preferably coupled with the use of a light stabilizer or pigment as discussed below. Examples of unsaturated diisocyanates include, but are not limited to, substituted and isomeric mixtures including 2,2'-, 2,4'-, and 4,4'-diphenylmethane diisocyanate (MDI), 3,3'-dimethyl-4,4'-biphenyl diisocyanate (TODI), toluene diisocyanate (TDI), polymeric MDI (PMDI, a brown liquid composed of approximately 50% methylene diisocyanate with the remainder comprised of oligomers of MDI), carbodiimide-modified liquid 4,4'-diphenylmethane diisocyanate, para-phenylene diisocyanate (PPDI), meta-phenylene diisocyanate (MPDI), triphenylmethane-4,4'-, and triphenylmethane-4,4'-triisocyanate, napthylene-1,5,-diisocyanate, 2,4'-, 4,4'-, and 2,2'-biphenyl diisocyanate, polyphenylene polymethylene polyisocyanate (PMDI) (also known as polymeric PMDI), and mixtures thereof.

The isocyanate-containing component itself may be covalently incorporated or functionalized with cationic group or precursor group thereof. In one embodiment, the isocyanate-containing component is functionalized with at least one precursor cationic group such as —N, —P, =S, and mixtures thereof. In another embodiment, the isocyanate-containing component is functionalized with at least one neutralized cationic group including, but not limited to, $\equiv N^{\oplus}$—, $\equiv P^{\oplus}$—, $\equiv S^{\oplus}$—, and mixtures thereof.

Those of ordinary skill in the art would be aware of suitable methods of incorporating at least one cationic group or precursor group thereof to the isocyanate-containing component. For example, tertiary amines, phosphines, sulfides, and the like may be incorporated into the isocyanate-containing component. Suitable compounds for use in this aspect of the invention include, but are not limited to, methyldiethanolamine (hydrochloride salt, acetic acid salt), N,N-di(2-hydroxypropyl) aniline (hydrochloride salt, acetic acid salt), N-cyclohexyl-N-(3-aminopropyl) propanol-2-amine (hydrochloride salt, acetic acid salt), ethyldiethanolamine (hydrochloride salt, acetic acid salt), glycerol-α-bromohydrin quaternized with tributylamine (ammonium salt), triethyl phosphine (phosphonium salt), glycerol-α-bromohydrin ternarized with dimethyl sulfide (sulfonium salt), and mixtures thereof.

Likewise, those of ordinary skill in the art would be aware of methods to neutralize the cationic precursor group. In fact, the synthesis of a quaternary ammonium salt should be known to those of ordinary skill in the art. For example, an amine can react with an alkyl halide, producing an amine of the next higher class, wherein one of the hydrogens attached to nitrogen has been replaced by an alkyl group, which eventually produces an ammonium salt. The general reaction scheme is demonstrated below:

Any or all of the R groups may be the same or different substituted or unsubstituted alkyl groups. Also, any of the R groups may be connected. $X^-$ may be any one of fluoride, chloride, bromide, iodide, hydroxide, carbonate, and mixtures thereof.

A quaternary ammonium salt, contemplated by the inventors as a suitable cationic group according to the present invention, has the following general formula:

R and $X^-$ are as defined above.

The functionalized isocyanate-containing component may be neutralized prior to, during, or after polymerization. In this aspect of the invention, the isocyanate-containing component may include at least one quaternized tertiary amine, alkylated phosphine group, alkylated sulfide group, or a mixture thereof prior to reaction with any isocyanate-reactive components. In an alternate embodiment, the isocyanate-containing component includes at least one cationic precursor group that may later be neutralized.

In another embodiment, the isocyanate-containing component includes at least one quaternizing or ternarizing moiety that can later, e.g., prior, during, or after polymerization, be reacted with a separate reagent that includes a precursor phosphine or sulfide group to form the cationic groups in the polymer.

Regardless of when it is introduced (e.g., prior to, during, or after polymerization), the neutralizing agent is preferably added in an amount sufficient to react with at least about 10 percent of the potential cationic groups. In one embodiment, the neutralizing agent is added in an amount sufficient to react with at least about 20 percent of the potential cationic groups. In another embodiment, the neutralizing agent is added in an amount sufficient to react with between about 20 percent and 60 percent of the potential cationic groups. A flow modifier may increase the reaction between the neutralizing agent and the potential cationic groups. As such, in one embodiment, the neutralizing agent and a flow modifier are used to achieve conversion of greater than about 60 percent, preferably at least about 75 percent, and more preferably about 90 percent or more of the potential cationic groups to cationic groups.

Isocyanate-Reactive Component

Whether forming a prepolymer or chain extending the prepolymer with an amine-terminated component, the isocyanate groups in the isocyanate-containing component react with the amine groups of the isocyanate-reactive component (also referred to herein as amine-terminated component) to form a repeating urea linkage, which has the following general structure:

where x is the number of repeat units, i.e., about 1 or greater, and R and $R_1$ independently include straight chain or branched aliphatic groups, substituted straight chain or branched aliphatic groups, aromatic groups, substituted aromatic groups, or mixtures thereof.

Any amine-terminated component available to one of ordinary skill in the art is suitable for use in the compositions of the invention. For example, the amine-terminated prepolymer component may include amine-terminated hydrocarbons including amine-terminated polyolefins, amine-terminated polyethers, amine-terminated polyesters including amine-terminated polycaprolactones, amine-terminated polycarbonates, amine-terminated polyamides including amine-terminated polycaprolactams, amine-terminated polyacrylates, amine-terminated polysiloxanes, amine-terminated polyimines, amine-terminated polyimides, and mixtures thereof. U.S. Pat. No. 6,958,379, which is incorporated by reference herein, discloses suitable amine-terminated compounds for use with the present invention.

In addition, the amine-terminated component may be a copolymer of any of the amine-terminated components listed above. For example, in one embodiment, the amine-terminated component includes amine-terminated polyolefinsiloxanes (such as α,ω-diamino poly(butadiene-dimethylsiloxane) and α,ω-diamino poly(isobutylene-dimethylsiloxane)), amine-terminated polyetherolefins (such as α,ω)-diamino poly(butadiene-oxyethylene)), amine-terminated polyetheresters, amine-terminated polyethercarbonates, amine-terminated polyetheramides, amine-terminated polyetheracrylates, amine-terminated polyethersiloxanes, amine-terminated polyesterolefins (such as α,ω-diamino poly(butadiene-caprolactone) and (α,ω-diamino poly(isobutylene-caprolactone)), amine-terminated polyesteramides, amine-terminated polyestercarbonates, amine-terminated polyesteracrylates, amine-terminated polyestersiloxanes, amine-terminated polyamideolefins, amine-terminated polyamidecarbonates, amine-terminated polyamideacrylates, amine-terminated polyamidesiloxanes, amine-terminated polyamideimides, amine-terminated polycarbonateolefins, amine-terminated polycarbonateacrylates, amine-terminated polycarbonatesiloxanes, amine-terminated polyacrylateolefins (such as α,ω-diamino poly(butadiene-methyl methacrylate), α,ω-diamino poly(isobutylene-t-butyl methacrylate), and α,ω-diamino poly(methyl methacrylate-butadiene-methyl methacrylate)), amine-terminated polyacrylatesiloxanes, amine-terminated polyetheresteramides, and combinations thereof. U.S. Pat. No. 7,098,274, incorporated by reference in its entirety herein, discloses more specific examples of amine-terminated components suitable for use with the present invention.

The amine-terminated component may be in the form of a primary amine ($R_1$—$NH_2$), a secondary amine ($R_1$—$NHR_2$), tertiary amine ($R_1$—$NR_2R_3$), or mixtures thereof. As such, the amine-terminated component includes the following generic structures:

where $R_1$ may be an unsubstituted or substituted straight chain or branched aliphatic groups, unsubstituted or substituted aromatic groups, or mixtures thereof and $R_2$ and $R_3$ may independently be an alkyl, aryl, or aralkyl group.

The present invention also contemplates the use of triamines with similar generic structures:

where $R_1'$ and $R_1''$ may independently be an unsubstituted or substituted straight chain or branched aliphatic groups, unsubstituted or substituted aromatic groups, or mixtures thereof and $R_2$ and $R_3$ may independently be an alkyl, aryl, or aralkyl group.

The molecular weight of the amine-terminated component for use in the invention may range from about 100 to about 10,000. In one embodiment, the amine-terminated component is about 500 or greater, preferably about 1000 or greater, and even more preferably about 2000 or greater. In another embodiment, the amine-terminated component molecular weight is about 8000 or less, preferably about 4,000 or less, and more preferably about 3,000 or less. For example, in one embodiment, the molecular weight of the amine-terminated component is about 1000 to about 4000.

The amine-terminated component itself may be covalently incorporated or functionalized with cationic group or precursor group thereof. Similar methods as discussed above with respect to suitable methods for functionalizing the isocyanate-containing component with a cationic group or a precursor group thereof may be employed to functionalize an amine-terminated component according to the present invention. For example, because, in general, tertiary amino groups may be quaternized or ternarized, no additional functional groups need be added to the amine-terminated component if the amine-terminated component itself includes at least one terminal tertiary amine group.

The amine-terminated component may be functionalized with at least one tertiary amine group (≡N), phosphine group (≡P), or sulfide group (≡S). For example, a primary or secondary diamine with at least one tertiary amine group may be used as the amine-terminated component of the invention. In another embodiment, a primary or secondary triamine with at least one tertiary amine group may be used as the amine-terminated component. Alternatively, a quaternizing or ternarizing moiety may be added to the amine-terminated component and later reacted with a separate reagent that includes phosphine or sulfide.

In one embodiment, the amine-terminated component of the present invention is a primary or secondary diamine with one or more precursor cationic groups. In another embodiment, the amine-terminated component of the present invention is a primary or secondary triamine with one or more precursor cationic groups. The precursor cationic groups may be neutralized prior to reaction with the isocyanate-containing component. For example, the amine-terminated component may include at least one neutralized cationic group including, but not limited to, ≡N$^⊕$—, ≡P$^⊕$—, ≡S$^⊕$—, and mixtures thereof, prior to polymerization with the isocyanate-containing component. In the alternative, the amine-termination component may be neutralized during or after polymerization with the isocyanate-containing component.

The cationic or precursor cationic groups preferably account for about 1 percent to about 50 percent of the weight of the amine-terminated component. In one embodiment, the cationic or precursor cationic groups constitute about 3 percent to about 45 percent of the weight of the amine-terminated component. In another embodiment, the cationic or precursor cationic groups account for about 5 percent to about 35 percent of the weight of the amine-terminated component. In still another embodiment, the cationic or precursor cationic groups constitute about 5 percent to about 25 percent of the weight of the amine-terminated component. And, when included in the isocyanate-containing component and/or curative, the cationic or precursor cationic groups preferably account for about the same ranges of the weight of the component.

Amine-Based Curative

As generally understood by those of ordinary skill in the art, the process of making polyurea compositions generally includes formation of a prepolymer with a relatively long chain (high molecular weight) amine-terminated component to produce a prepolymer containing free isocyanate groups that is then chain extended with a short chain (low molecular weight) amine-terminated curing agent to form a polyurea. The long chain, high molecular weight amine-terminated component provides flexibility and elastomeric properties to the resin, while the short chain amine-terminated curing agent provides chain extension or cross-links and adds toughness and rigidity to the resulting elastomeric polymer. Thus, any of the amine-terminated moieties listed above for use as the isocyanate-reactive amine-terminated component may be used as curing agents to react with a prepolymer or the isocyanate-containing component may be directly reacted with the amine-based curative to form the polymer. However, the amine-terminated curing agent preferably has a molecular weight of about 64 or greater. In one embodiment, the molecular weight of the amine-curing agent is about 2000 or less.

As such, like the isocyanate-containing component and the isocyanate-reactive component above, the curative may be a source of cationic or precursor cationic groups to achieve the present invention. For example, the amine-based curative may include an amine-terminated curing agent that does not include a cationic or precursor cationic group, a neutralizing agent, and optional flow modifier. In an alternate embodiment, the amine-based curative itself includes at least one precursor cationic group, a neutralizing agent, and an optional flow modifier. In still another embodiment, the amine-based curative includes at least one cationic or precursor cationic group, however, the neutralizing agent is present in the prepolymer, added separately during cure, or is added post-polymerization.

The curative may include a single amine-terminated curing agent or a mixture of amine-terminated curing agents. In one embodiment, the amine-terminated curing agent is an of the one of the following: ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl)ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 3,5-diethyltoluene-2,4-diamine; 3,5-diethyltoluene-2,6-diamine; 4,4'-bis-(sec-butylamino)-benzene; and derivatives thereof; 1,4-bis-(sec-butylamino)-benzene; 1,2-bis-(sec-butylamino)-benzene; N,N'-dialkylamino-diphenylmethane; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-ciaminocyclohexylmethane; and mixtures thereof. In one embodiment, the amine-terminated curing agent is 4,4'-bis-(sec-butylamino)-dicyclohexylmethane.

Of the list above, the saturated amine-terminated curing agents suitable for use with the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl)ether; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; triethanolamine; monoisopropanolamine, diisopropanolamine; triisopropanolamine; isophoronediamine; N,N'-diisopropylisophorone diamine and mixtures thereof.

In one embodiment, the curative used with the prepolymer include 3,5-dimethylthio-2,4-toluenediamine,3,5-dimethylthio-2,6-toluenediamine, 4,4'-bis-(sec-butylamino)-diphenylmethane, N,N'-diisopropyl-isophorone diamine; polyoxypropylene diamine; propylene oxide-based triamine; 3,3'-dimethyl-4,4'-diaminocyclohexylmethane; and mixtures thereof.

However, it should be understood that the curing agent may also be any of the above components in a form that includes cationic or precursor cationic groups, especially when neither the isocyanate-containing component nor the isocyanate-reactive component used to form the prepolymer contains such groups.

Because unhindered primary diamines result in a rapid reaction between the isocyanate groups and the amine groups, in certain instances, a hindered secondary diamine may be more suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (Clearlink® 1000) may be suitable for use in combination with an isocyanate to form the polyurea prepolymer. In addition, N,N'-diisopropyl-isophorone diamine, available from Huntsman Corporation under the tradename Jefflink, may be used as the secondary diamine curing agent.

In addition, a trifunctional curing agent can be used to help improve cross-linking and, thus, to further improve the shear resistance of the resulting polyurea elastomers. In one embodiment, a triol such as trimethylolpropane or a tetraol such as N,N,N',N'-tetrakis (2-hydroxylpropyl)ethylenediamine may be added to the formulations.

As discussed, the amine-based curative may include a neutralizing agent. Suitable neutralizing agents include, but are not limited to, any of the alkylating agents, quaternizing agents, ternarizing agents, or mixtures thereof previously discussed.

In another embodiment, the curative includes a flow modifier. Suitable flow modifiers include, but are not limited to, aliphatic, mono- or multi-functional (saturated, unsaturated, or multi-unsaturated) organic acids and salts thereof. In one embodiment, the organic acids are preferably saturated or unsaturated fatty acids or fatty acid salts. Suitable fatty acids include, but are not limited to, stearic acid, behenic acid, erucic acid, oleic acid, linoelic acid, myristic acid, palmitic acid, decanoic acid, or dimerized derivatives.

For example, saturated fatty acids such as butyric acid, caproic acid, caprylic acid, capric acid, lauric acid, myristic acid, palmitic acid, stearic acid, arachidic acid, behenic acid, lignoceric acid, and the like are contemplated for use as a flow modifier according to the present invention. Unsaturated fatty acids suitable for use as the flow modifier of the present invention include, but are not limited to, myristoleic acid, palmitoleic acid, oleic acid, linoleic acid, α-linolenic acid, arachidonic acid, eicosapentaenoic acid, erucic acid, and docosahexaenoic acid.

Suitable salts of fatty acids for use in accordance with the present invention, which may be formed by replacing one or more of the hydrogen atoms of the acid with an anion or cation, include, but are not limited to, barium salts, lithium salts, sodium salts, zinc salts, bismuth salts, chromium salts, cobalt salts, copper salts, potassium salts, strontium salts, titanium salts such as 2-ethylhexyl titanate, tungsten salts, magnesium salts, cesium salts, iron salts, nickel salts, silver salts, aluminum salts, tin salts, calcium salts of fatty acids.

For example, barium, lithium, sodium, zinc, bismuth, chromium, cobalt, copper, potassium, strontium, titanium, tungsten, magnesium, cesium, iron, nickel, silver, aluminum, tin, or calcium salts of stearic, behenic, erucic, oleic, linoelic or dimerized derivatives thereof are contemplated for use as the flow modifier in accordance with the present invention. In one embodiment, the flow modifier includes at least one of zinc stearate, magnesium stearate, calcium stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate, zinc lignocerate, or mixtures thereof. In another embodiment, the flow modifier is zinc stearate.

Method of Forming the Composition

As discussed above, there are several methods for forming the compositions of the invention. Precursor groups of cationic groups may be incorporated into the isocyanate-containing component, the isocyanate-reactive component, or curative before, during, or after the prepolymer formation or the curing reaction. They can be neutralized to corresponding cationic groups before, during, or after prepolymer formation or the curing reaction. For example, cationic precursor groups such as tertiary amine, phosphine, and sulfide groups can be neutralized by quaternization of the tertiary amine, or by reacting the phosphine or sulfide with compounds capable of alkylating the phosphine or sulfide groups.

The polyurea compositions of the invention may be prepared using the one-shot process, i.e., the reactants above are added simultaneously under polymerization conditions. In this type of process, the isocyanate-containing component and the amine-terminated prepolymer component and/or curative may be combined under polymerization conditions to form the product. Any or all of these components may include the precursor cationic groups or cationic groups. If the resulting polymer includes precursor cationic groups, the polymer may be subjected to a neutralizing agent in a post-polymerization reaction. Alternatively, the component containing the precursor cationic group may be neutralized prior to polymerization.

In addition, the polyurea compositions of the invention may be formed using a prepolymer method, i.e., a prepolymer with excess isocyanate groups is chain extended with a curative. While both types of processes are contemplated for use with the present invention, the prepolymer method affords greater control over the reaction process. For example, in one embodiment, an isocyanate-containing component and an amine-terminated component with at least one precursor cationic group is reacted to form a polyurea prepolymer that is then chain extended with an amine-based curative that includes a neutralizing agent and an optional flow modifier. The amine-terminated component may be neutralized before reaction to form the prepolymer, during reaction to form the prepolymer, during the cure stage, or post-polymerization.

The content of reactable isocyanate moieties in the polyurea prepolymer, expressed as percent NCO by weight, may be manipulated to control such factors as curing rate, hardness of the resulting material, and the like. All else being the same, the hardness of the resulting material can increase as the percent NCO of the prepolymer increases. The percent NCO by weight in the prepolymer may be less than about 15 percent, less than about 11 percent, less than about 9 percent, less than about 7 percent, or even less, or at least about 2 percent, such as about 3 percent or about 4 percent or greater, or any percentage therebetween, such as about 5 to 11 percent, about 6 to 10 percent, about 3 to 9 percent, about 2.5 to 7.5 percent, or about 4 to 6.8 percent. Prepolymers with higher percent NCO (e.g., 14 percent or higher) can be converted to prepolymers with lower percent NCO (e.g., 10 percent) by further reacting with one or more other isocyanate-reactive components.

When the prepolymer includes precursor cationic groups or cationic groups, the cationic groups comprise between about 1 to about 50 percent by weight of the prepolymer. In one embodiment, the prepolymer includes between about 5 percent to about 45 percent cationic groups by weight of the prepolymer. In another embodiment, the prepolymer includes between about 10 percent and about 35 percent cationic groups by weight of the prepolymer. In yet another embodiment, between about 5 weight percent and 25 weight percent cationic groups are present in the prepolymer.

When the curing agent includes precursor cationic groups or cationic groups, the cationic groups comprise between about 1 to about 50 percent by weight of the curing agent. In one embodiment, the curing agent includes between about 5 percent to about 45 percent cationic groups by weight of the curing agent. In another embodiment, the curing agent includes between about 10 percent and about 35 percent cationic groups by weight of the curing agent. In yet another embodiment, between about 5 weight percent and 25 weight percent cationic groups are present in the curing agent.

With respect to the neutralization, quaternarization or ternarization step, whatever the case may be, the neutralizing agent may be added in a sufficient amount to react with at least about 10 percent of the potential cationic groups or moieties in the polymer. In one embodiment, the neutralizing agent is added in an amount sufficient to react with between about 10 percent and 70 percent, between about 20 percent to about 60 percent, between about 30 percent to about 70 percent, or the like, of the potential cationic moieties.

The percent of neutralization may increase with the addition of a flow modifier. As such, the use of a flow modifier either in the amine-based curative or in a blend with a neutralizing agent if a post-polymerization reaction is used is contemplated by the present invention. Any of the flow modifiers listed above for possible inclusion in the amine-based curative is suitable for use in this aspect of the invention. A skilled artisan would be aware that the flow modifier is preferably selected such that the molecular weight is much less than the acid-containing component, e.g., about 200 or greater, about 2000 or less, or somewhere in between. The small molecular weight of the flow modifier allows proper adjustment of the melt flow index of the resulting composition.

In this aspect of the invention, the flow modifier is added in an amount of about 15 parts per hundred (pph) to about 75 pph based on a hundred parts of the acid-containing component. In one embodiment, the flow modifier is added in an amount of about 20 pph to about 70 pph. In another embodiment, the flow modifier is present in an amount of about 25 pph to about 50 pph. In yet another embodiment, the flow modifier is added in an amount of about 25 pph to about 75 pph.

With the flow modifier, the precursor cationic moieties are neutralized greater than about 70 percent. In one embodiment, the neutralization level is about 80 percent or greater. In another embodiment, the neutralization level is about 90 percent or higher. In yet another embodiment, the acid moieties are fully neutralized, i.e., all of the acid moieties (100 percent) are neutralized.

In addition to the general reaction chemistry, the actual process of forming the composition may differ based on the desired final product. For example, the ratio of isocyanate groups and amino groups determine whether the final product is thermoplastic or thermoset, each of which is contemplated for use with the present invention. In one embodiment, the ratio of NCO groups on the isocyanate-containing component to active hydrogen groups on the amine-terminated prepolymer component and amine-based curative is between about 1:0.7 and about 1:1.3. For example, those of ordinary skill in the art will be aware that a ratio between about 1:0.9 and about 0.9:1, more preferably between about 1:0.95 and about 0.95:1, will produce a thermoset product. In contrast, a ratio of about 1:1 NCO groups to active hydrogen groups will result in a thermoplastic product.

In one embodiment, the compositions of the invention are thermoplastic in nature. In another embodiment, the compositions of the invention are thermoset.

Additives

The compositions of the invention may include a variety of additives. For example, the compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Fillers may also be added to the compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

When the compositions of the invention are used in the core layers of the golf ball, fillers may also be used to modify the weight of the core to create a specialty ball, e.g., a lower weight ball is preferred for a player having a low swing speed.

Additional materials conventionally included in other golf ball compositions may also be included in the compositions of the invention. For example, antioxidants, stabilizers, softening agents, plasticizers, including internal and external plasticizers, reinforcing materials, and compatibilizers may also be added to any composition of the invention. Those of ordinary skill in the art are aware of the purpose of these additives and the amounts that should be employed to fulfill those purposes.

Blends

The compositions of the present invention may also be blended with other polymers. In particular, the compositions of the invention preferably include about 1 percent to about 100 percent of the polyurea product. In one embodiment, the compositions contain about 10 percent to about 90 percent of the polyurea product, preferably from about 10 percent to about 75 percent of the polyurea product, and about 90 percent to 10 percent, more preferably from about 90 percent to about 25 percent of the second polymer component and/or other materials as described below. For example, a blend in accordance in the present invention may have about 10 percent to about 40 percent of the polyurea product and about 60 percent to about 90 percent of another thermoplastic polymer, e.g., a conventional ionomer. In an alternate embodiment, a blend in accordance with the invention may include about 40 percent to about 80 percent of the polyurea product and about 20 percent to about 60 percent of another thermoplastic polymer. Unless otherwise stated herein, all percentages are given in percent by weight of the total composition of the golf ball layer in question.

For example, the compositions of the invention may be present in a blend with ionomeric copolymers or terpolymers, ionomeric precursors, thermoplastics, polyamides, polycarbonates, polyesters, polyurethanes, polyureas, thermoplastic elastomers, polybutadiene rubber, balata, grafted and non-grafted metallocene-catalyzed polymers, single-site polymers, high-crystalline acid polymers, cationic polymers, cationic and anionic urethane ionomers and urethane epoxies, polyurethane ionomers, polyurea ionomers, epoxy resins, polyethylenes, polyacrylin, siloxanes, and mixtures thereof.

Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention that are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety.

One of ordinary skill in the art would be well aware of methods to blend these polymeric materials with the organically modified silicate of the invention to form a composition for use in golf ball layers.

Golf Ball Construction

As discussed briefly above, the compositions of the present invention may be used with any type of ball construction including, but not limited to, one-piece, two-piece, three-piece, and four-piece designs, a double core, a double cover, an intermediate layer(s), a multilayer core, and/or a multi-layer cover depending on the type of performance desired of the ball. That is, the compositions of the invention may be used in a core, an intermediate layer, and/or a cover of a golf ball, each of which may have a single layer or multiple layers. In one embodiment, the compositions of the invention are used as a cover layer in a golf ball.

As used herein, the term "multilayer" means at least two layers. For instance, the core may be a one-piece core or a multilayer core, i.e., a core that has an innermost component with an additional core layer or additional core layers disposed thereon. As used herein, the terms "core" and "center" are generally used interchangeably to reference the innermost component of the ball. In some embodiments, however, the term "center" is used when there are multiple core layers, i.e., a center and an outer core layer.

When the golf ball of the present invention includes an intermediate layer, which may also include more than one layer, this layer may be incorporated with a single or multi-layer cover, a single or multi-piece core, with both a single layer cover and core, or with both a multilayer cover and a multilayer core. The intermediate layer may be also be referred to as an inner cover layer or outer core layer, or any other layer(s) disposed between the inner core and the outer cover of a golf ball.

Figure 1:
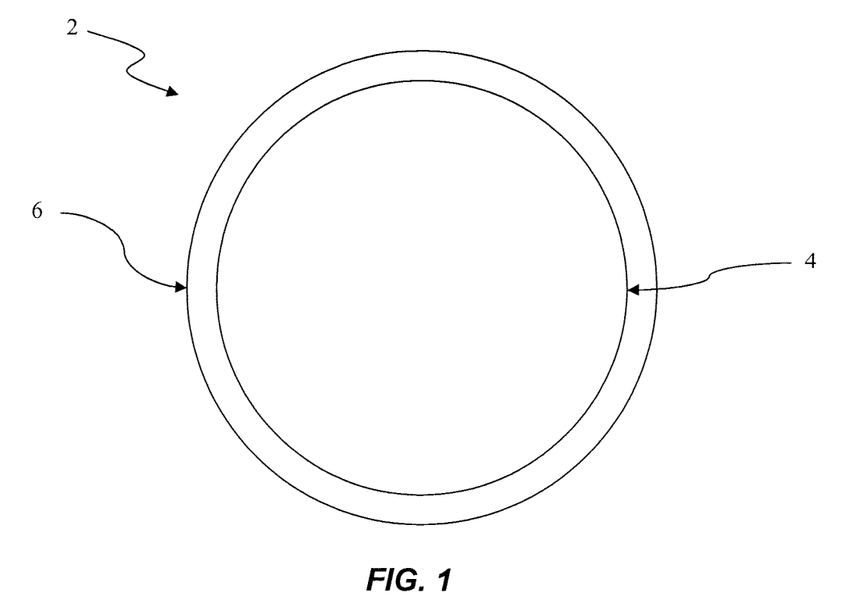
FIG. 1 is a cross-sectional view of a two-piece golf ball, wherein the cover is formed from a composition of the invention.

Referring to FIG. 1, a golf ball 2 of the present invention can include a center 4 and a cover 6 surrounding the center 4. While dimensions and materials are discussed in more detail below, a golf ball of the invention can include a large core, e.g., about 1.55 inches to about 1.60 inches, and a relatively soft, thin cover formed from the composition of the invention. In particular, the cover may have a thickness of about 0.02 inches to about 0.07 inches, preferably about 0.02 inches to about 0.045 inches, and more preferably about 0.025 inches to about 0.035 inches.

Figure 2:
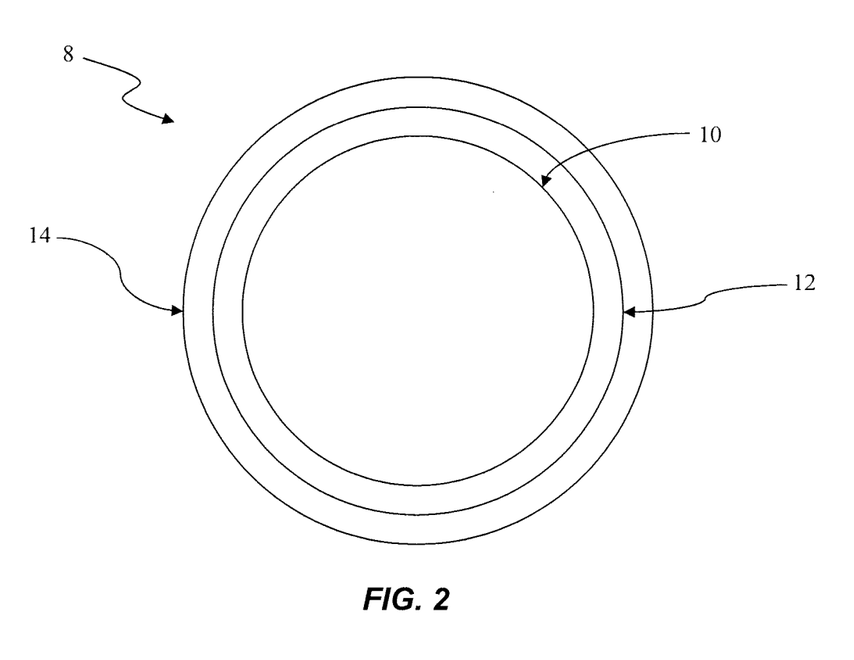
FIG. 2 is a cross-sectional view of a multi-component golf ball, wherein at least one layer is formed from a composition of the invention.

Referring to FIG. 2, a golf ball 8 of the present invention can include a center 10, a cover 14, and at least one intermediate layer 12 disposed between the cover and the center. In one embodiment, the cover 14 is formed from the composition of the invention. In another embodiment, the intermediate layer 12 is formed from the composition of the invention. Each of the cover and center layers in FIG. 1 or 2 may include more than one layer, i.e., the golf ball can be a conventional three-piece wound ball, a two-piece ball, a ball having a multi-layer core and an intermediate layer or layers, etc.

Figure 3:
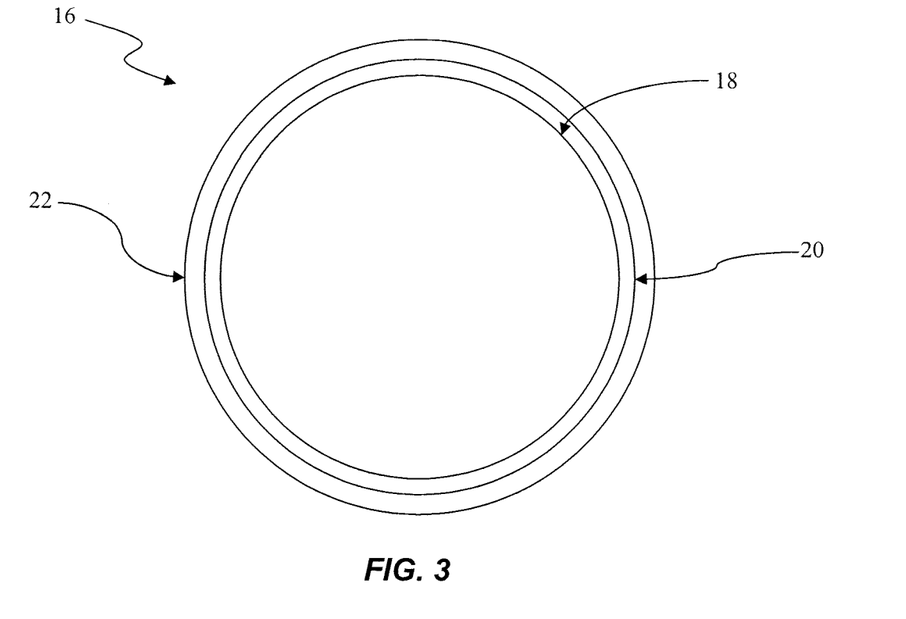
FIG. 3 is a cross-sectional view of a multi-component golf ball having a large core, wherein at least one layer is formed from a composition of the invention.

Also, FIG. 3 shows a golf ball 16 of the present invention including a large core 18, a cover 22, and an inner cover layer 20. In one embodiment, the core 18 includes a center and an outer core layer. The cover 22 and/or inner cover layer 20 may be formed from the composition of the invention. In one embodiment, the cover 22 is formed from the composition of the invention.

Figure 4:
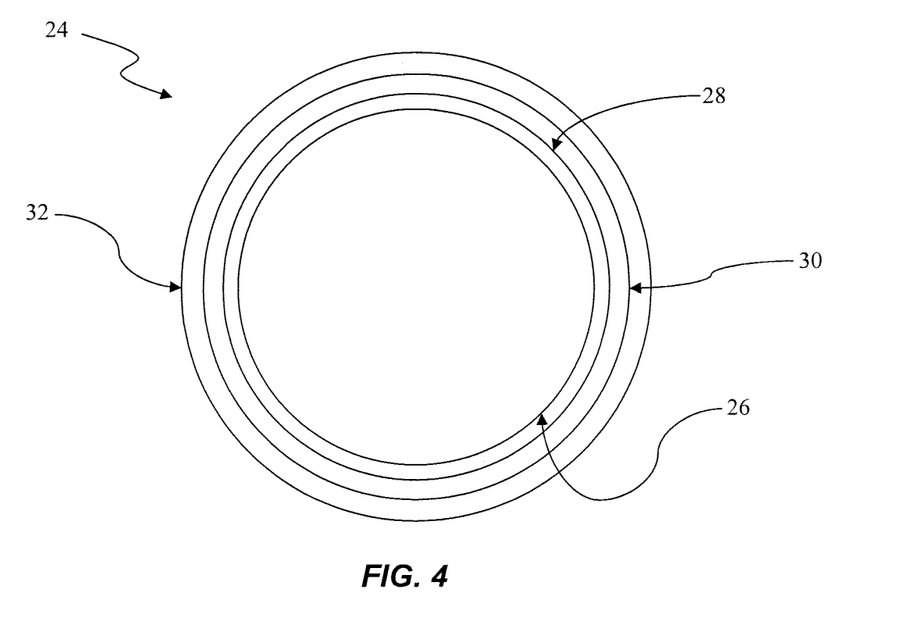
FIG. 4 is a cross-sectional view of a multi-component golf ball including a dual core and a dual cover, wherein at least one layer is formed from a composition of the invention.

In another embodiment, as shown in FIG. 4, a golf ball 24 of the present invention can include a large core having a center 26 and an intermediate layer 28 disposed underneath a dual cover having an inner cover layer 30 and an outer cover layer 32. The inner cover layer 30 and/or outer cover layer 32 is formed from the compositions of the invention. In one embodiment, the outer cover layer 32 is formed from the compositions of the invention. Further, any of the figures detailed herein may include embodiments wherein an optional wound layer is disposed between the center and the core of the golf ball.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Golf Ball Core Layer(s)

The cores of the golf balls formed according to the invention may be solid, semi-solid, hollow, fluid-filled or powder-filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like.

The core may have a diameter of about 1.5 inches to about 1.62 inches and the cover layer thickness may range from about 0.03 inches to about 0.06 inches. The core compression preferably ranges from about 30 to about 120 atti and the overall ball compression is about 50 to about 110.

Any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. For example, butadiene rubber, which, in an uncured state, typically has a Mooney viscosity (measured according to ASTM D1646-99) greater than about 20, preferably greater than about 30, and more preferably greater than about 40, may be used in one or more core layers of the golf balls prepared according to the present invention. In addition, the compositions of the invention may be incorporated the core.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer may be formed from the composition of the invention. For example, an intermediate layer or inner cover layer having a thickness of about 0.015 inches to about 0.06 inches may be disposed about a core. In this aspect of the invention, the core, which has a diameter ranging from about 1.5 inches to about 1.59 inches, may also be formed from a composition of the invention or, in the alternative, from a conventional rubber composition. The inner ball may be covered by a castable thermoset or injection moldable thermoplastic material or any of the other cover materials discussed below. In this aspect of the invention, the cover may have a thickness of about 0.02 inches to about 0.045 inches, preferably about 0.025 inches to about 0.04 inches. The core compression is about 30 to about 110 atti, preferably about 50 to about 100 atti, and the overall ball compression preferably ranges from about 50 to about 100 atti.

When not formed from the composition of the invention, the intermediate layer may be formed from a number of thermoplastic and thermosetting materials. For example, the intermediate layer(s) may be formed, at least in part, from one or more homopolymeric or copolymeric materials, such as ionomers, primarily or fully non-ionomeric thermoplastic materials, vinyl resins, polyolefins, polyurethanes, polyureas, such as those disclosed in U.S. Pat. No. 5,484,870, polyamides, acrylic resins and blends thereof, olefinic thermoplastic rubbers, block copolymers of styrene and butadiene, isoprene or ethylene-butylene rubber, copoly(ether-amide), such as PEBAX, sold by Arkema, Inc. of Philadelphia, Pa., polyphenylene oxide resins or blends thereof, and thermoplastic polyesters.

For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

The intermediate layer may also include a wound layer formed from a tensioned thread material. The thread may be single-ply or may include two or more plies. Suitable thread materials include, but are not limited to, fiber, glass, carbon, polyether urea, polyether block copolymers, polyester urea, polyester block copolymers, syndiotactic- or isotactic-poly (propylene), polyethylene, polyamide, poly(oxymethylene), polyketone, poly(ethylene terephthalate), poly(p-phenylene terephthalamide), poly(acrylonitrile), diaminodicyclohexylmethane, dodecanedicarboxylic acid, natural rubber, polyisoprene rubber, styrene-butadiene copolymers, styrene-propylene-diene copolymers, another synthetic rubber, or block, graft, random, alternating, brush, multi-arm star, branched, or dendritic copolymers, or mixtures thereof. Those of ordinary skill in the art are aware of the process for producing thread materials for use with the present invention.

Golf Ball Cover Layer(s)

The cover provides the interface between the ball and a club. Properties that are desirable for the cover are good moldability, high abrasion resistance, high impact resistance, high tear strength, high resilience, and good mold release, among others. The cover layer may be formed, at least in part, from a composition of the invention. For example, the present invention contemplates a golf ball having a large core of polybutadiene and a thin cover formed from the composition of the invention.

When the compositions of the invention are incorporated into a core or intermediate/inner cover layer, however, the cover may be formed from one or more homopolymeric or copolymeric materials as discussed in the section above pertaining to the intermediate layer. The cover may also be at least partially formed from a polybutadiene reaction product, as discussed above with respect to the core. Golf balls according to the invention may also be formed having a cover of polyurethane, polyurea, and polybutadiene materials discussed in U.S. Pat. No. 6,835,794.

Layer Formation

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

Cores of the golf balls of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer and/or cover layer may also be formed using any suitable method known to those of ordinary skill in the art. For example, an intermediate layer may be formed by blow molding and covered with a dimpled cover layer formed by injection molding, compression molding, casting, vacuum forming, powder coating, and the like.

For example, when the compositions of the invention are formed into a cover, the prepolymer and curative blend may be mixed and poured into a mold. The temperature of the mold preferably ranges from about 100° F. to about 250° F. In one embodiment, the mold temperature ranges from about 120° F. to about 200° F. In another embodiment, the temperature of the mold ranges from about 140° F. to about 180° F. In still another embodiment, the mold temperature is about 150° F. to about 170° F.

The gel times preferably range from about 10 seconds to about 200 seconds. "Gel time" as used herein represents the amount of time, from the time the components are mixed to the time that the material is polymerized sufficiently that, if touched lightly with the edge of a metal spatula, no material adheres to the spatula, although the material is rubbery enough that an indentation in the material could easily and visibly be made. In contrast, "demold time" is the time at which the molded article is demolded without damage. In one embodiment, the gel time is from about 30 seconds to about 150 seconds. In another embodiment, the gel time is from about 40 seconds to about 130 seconds. In still another embodiment, the gel time is from about 45 seconds to about 120 seconds. Those of ordinary skill in the art are aware that the shorter gel times relate to higher NCO content. For example, a conventional polyurethane or polyurea composition with an NCO content of about 9 percent will typically result in a faster reaction rate and, thus, gel time of about 45 seconds.

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Furthermore, the resultant golf balls prepared according to the invention typically will have dimple coverage greater than about 60 percent, preferably greater than about 65 percent, and more preferably greater than about 70 percent.

Golf Ball Post-Processing

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

Any of the golf ball layers may be surface treated by conventional methods including blasting, mechanical abrasion, corona discharge, plasma treatment, and the like, and combinations thereof. In fact, because low surface energy, or surface tension, is a key feature of polysiloxanes, layers formed from the compositions of the invention may be surface treated according to U.S. Patent Publication No. 2003/0199337, the disclosure of which is incorporated in its entirety by reference herein.

Golf Ball Properties

The properties such as core diameter, intermediate layer and cover layer thickness, hardness, and compression have been found to effect play characteristics such as spin, initial velocity and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches (43 mm) to about 1.740 inches (44 mm) is most preferred, however diameters anywhere in the range of from 1.700 to about 1.950 inches can be used.

Preferably, the overall diameter of the core and all intermediate layers is about 80 percent to about 98 percent of the overall diameter of the finished ball. The core may have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches. In one embodiment, the core diameter is about 1.59 inches or greater. In another embodiment, the diameter of the core is about 1.64 inches or less.

When the core includes an inner core layer and an outer core layer, the inner core layer is preferably about 0.5 inches or greater and the outer core layer preferably has a thickness of about 0.1 inches or greater. For example, when part of a multi-layer ball according to invention, the center may have a diameter ranging from about 0.5 inches to about 1.30 inches and the outer core layer may have a diameter ranging from about 0.12 inches to about 0.5 inches. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.12 inches, preferably about 0.1 inches or less. For example, when part of a two-piece ball according to invention, the cover may have a thickness ranging from about 0.03 inches to about 0.09 inches. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, or a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. For example, when part of a three-piece ball or multi-layer ball according to invention, the intermediate layer and/or inner cover layer may have a thickness ranging from about 0.015 inches to about 0.06 inches. In another embodiment, the intermediate layer thickness is about 0.05 inches or less, more preferably about 0.01 inches to about 0.045 inches.

Hardness

Because the compositions of the invention may be used in any layer of a golf ball, the golf ball construction, physical properties, and resulting performance may vary greatly depending on the layer(s) of the ball that include the compositions of the invention.

The cores included in golf balls of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D. In another embodiment, the core has a Shore C hardness of from about 30 Shore C to greater than 90 Shore C, more preferably about 40 Shore C to 92 Shore C, and most preferably about 50 Shore C to 91 Shore C.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. For example, when an intermediate layer is formed from the composition of the invention, the hardness of the intermediate layer may be about 65 Shore D or less, preferably ranging from about 35 Shore D to about 60 Shore D. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater. For example, a golf ball of the invention may include an inner cover formed from a rosin-modified polymeric composition of the invention having a hardness of about 60 Shore D to about 75 Shore D.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 60 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In one embodiment, the cover hardness is about 60 Shore D or greater. In another embodiment, the cover hardness is about 62 Shore D or greater. In still another embodiment, the cover hardness is about 64 Shore D or greater. For example, the cover hardness may range from about 55 Shore D to about 85 Shore D. In another embodiment, the cover hardness is about 60 Shore D to about 80 Shore D. This range of hardness may be used in a 2-piece ball, i.e., a ball with a core and a cover, as well as a multilayer ball, e.g., a ball with one or more intermediate layers disposed between the core and the cover.

Compression

Compression is an important factor in golf ball design. For example, the compression of the core can affect the spin rate of the ball off the driver, as well as the feel of the ball when struck with the club. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured.

The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton.

As known to those of ordinary skill in the art, compression values are dependent on the diameter of the component being measured. The Atti compression of the core, or portion of the core, of golf balls prepared according to the invention may range from about 30 to about 110 atti, preferably about 50 to about 100 atti. In one embodiment, the core compression is less than about 80, preferably less than about 75. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 50 to 100. In yet another embodiment, the compression of the golf balls of the invention is about 75 or greater and about 95 or less. For example, a preferred golf ball of the invention may have a compression from about 80 to about 95.

Coefficient of Restitution

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Alternatively, the maximum COR of the ball is one that does not cause the golf ball to exceed initial velocity requirements established by regulating entities such as the USGA. As used herein, the term "coefficient of restitution" (CoR) is calculated by dividing the rebound velocity of the golf ball by the incoming velocity when a golf ball is shot out of an air cannon. The COR testing is conducted over a range of incoming velocities and determined at an inbound velocity of 125 ft/s. Another measure of this resilience is the "loss tangent," or tan $\delta$, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("Mn") or weight average molecular weight ("Mw"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising a core and a cover, wherein the cover comprises
 a polymer comprising:
  polyurea prepolymer comprising an isocyanate-containing component and an isocyanate-reactive component,
  wherein the isocyanate-containing component consists of the reaction product of an isocyanate-containing compound and at least one compound selected from the group consisting of triethyl phosphine, glycerol-α-bromohydrin ternarized with dimethyl sulfide, and mixtures thereof,
  and wherein the isocyanate-containing component comprises at least one precursor cationic group selected from the group consisting of =P, =S, and mixtures thereof; and
 a curative comprising:
  an amine-terminated curing agent;
  zinc stearate; and
  a neutralizing agent having the general formula

QX where Q comprises a benzyl group and X comprises a monovalent anion, and
  wherein the neutralizing agent is present in an amount sufficient to react with between about 10 percent and about 70 percent of the precursor cationic groups.

2. The golf ball of claim 1, wherein the cover comprises an inner cover and an outer cover.

3. The golf ball of claim 2, wherein the outer cover comprises the polymer.

4. The golf ball of claim 2, wherein the inner cover comprises the polymer.

5. The golf ball of claim 1, wherein the isocyanate-reactive component comprises a primary diamine, a secondary diamine, a primary triamine, a secondary triamine, or a mixture thereof.

6. The golf ball of claim 5, wherein the isocyanate-reactive component comprises a primary triamine or a secondary triamine.

7. A golf ball comprising a core and a cover, wherein the cover comprises
 a polymer comprising:
  a polyurea prepolymer comprising the reaction product of an isocyanate-containing component and an isocyanate-reactive component, wherein the isocyanate-reactive component has one of the following general structures:

where $R_1$ comprises unsubstituted or substituted straight chain or branched aliphatic groups, unsubstituted or substituted aromatic groups, or mixtures thereof, wherein $R_2$ and $R_3$ independently comprise an alkyl group, an aryl group, or an aralkyl group,
  wherein the isocyanate-containing component consists of the reaction product of an isocyanate-containing compound and at least one compound selected from the group consisting of triethyl phosphine, glycerol-α-bromohydrin ternarized with dimethyl sulfide, and mixtures thereof, and
  wherein the isocyanate-containing component comprises at least one precursor cationic group selected from the group consisting of =P, =S and mixtures thereof; and
  a curative comprising an amine-terminated compound, zinc stearate, and a neutralizing agent having the general formula QX, wherein Q comprises benzyl and X comprises a monovalent anion, and
  wherein the neutralizing agent is present in an amount sufficient to react with between about 30 percent and about 70 percent of the precursor cationic groups.

8. The golf ball of claim 7, wherein the monovalent anion comprises a halide.

9. The golf ball of claim 7, wherein the cover comprises an inner cover layer and an outer cover layer.

10. The golf ball of claim 9, wherein the inner cover layer comprises the polymer.

11. The golf ball of claim 9, wherein the outer cover layer comprises the polymer.

12. A golf ball comprising at least one layer comprising a polymer comprising the reaction product of:
    a polyurea prepolymer formed from the reaction product of an isocyanate-containing component and an amine-terminated component,
    wherein the isocyanate-containing component consists of the reaction product of a diisocyanate and at least one compound selected from the group consisting of triethyl phosphine, glycerol-α-bromohydrin ternarized with dimethyl sulfide, and mixtures thereof,
    and wherein the isocyanate-containing component comprises at least one precursor cationic group selected from the group consisting of ≡P, =S, and mixtures thereof;
    a curative comprising:
        an amine-terminated curing agent having at least one of the following general formulas:

where $R_1$ comprises unsubstituted or substituted straight chain or branched aliphatic groups, unsubstituted or substituted aromatic groups, or mixtures thereof, wherein $R_2$ and $R_3$ independently comprise an alkyl group, an aryl group, or an aralkyl group;
    a neutralizing agent having the general structure QX, wherein Q comprises a benzyl group and X comprises a monovalent anion, and wherein the neutralizing agent is present in an amount sufficient to react with between about 20 percent and about 60 percent of the precursor cationic groups; and
    a flow modifier comprising zinc stearate.

13. The golf ball of claim 12, wherein the monovalent anion comprises a halide.

14. The golf ball of claim 12, wherein the monovalent anion comprises fluoride, chloride, bromide, iodide, hydroxide, carbonate, and mixtures thereof.

15. The golf ball of claim 12, wherein the golf ball comprises a core, an intermediate layer disposed about the core to form an inner ball, and a cover disposed about the inner ball, and wherein the cover is formed from the polymer.

16. The golf ball of claim 15, wherein the intermediate layer is formed from a thermoplastic material.

17. The golf ball of claim 12, wherein the golf ball comprises a core, an intermediate layer disposed about the core to form an inner ball, and a cover disposed about the inner ball, and wherein the intermediate layer is formed from the polymer.

18. The golf ball of claim 12, wherein the polymer is thermoplastic.

19. The golf ball of claim 12, wherein the polymer is thermoset.

* * * * *